(12) United States Patent
Nepveu et al.

(10) Patent No.: US 11,496,723 B1
(45) Date of Patent: Nov. 8, 2022

(54) AUTOMATICALLY CAPTURING A MOMENT

(71) Applicant: Apple Inc., Cupertino, CA (US)

(72) Inventors: Bertrand Nepveu, Los Altos, CA (US); Yan Cote, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 15 days.

(21) Appl. No.: 16/581,074

(22) Filed: Sep. 24, 2019

Related U.S. Application Data

(60) Provisional application No. 62/738,723, filed on Sep. 28, 2018.

(51) Int. Cl.
*H04N 13/275* (2018.01)
*G06T 19/00* (2011.01)
*H04N 13/349* (2018.01)
*H04N 13/282* (2018.01)
*H04N 13/383* (2018.01)

(52) U.S. Cl.
CPC ......... *H04N 13/275* (2018.05); *G06T 19/006* (2013.01); *H04N 13/282* (2018.05); *H04N 13/349* (2018.05); *H04N 13/383* (2018.05)

(58) Field of Classification Search
CPC .. H04N 13/275; H04N 13/349; H04N 13/282; G06T 19/006
See application file for complete search history.

(56) References Cited

U.S. PATENT DOCUMENTS

| | | | |
|---|---|---|---|
| 10,600,235 B2 * | 3/2020 | Huston | G06T 7/521 |
| 10,692,288 B1 * | 6/2020 | Rasmussen | A63F 13/213 |
| 2014/0267730 A1 * | 9/2014 | Montesinos | H04N 7/183 348/148 |
| 2016/0322078 A1 * | 11/2016 | Bose | A63B 71/06 |
| 2016/0323565 A1 * | 11/2016 | van Baarsen | H04N 13/271 |
| 2017/0243359 A1 * | 8/2017 | Bose | G06K 9/00711 |
| 2017/0262697 A1 * | 9/2017 | Kaps | G11B 27/022 |
| 2018/0018508 A1 * | 1/2018 | Tusch | G06K 9/00771 |
| 2018/0183990 A1 * | 6/2018 | Chen | H04N 5/2256 |
| 2020/0005138 A1 * | 1/2020 | Wedig | G06K 9/00671 |
| 2020/0210336 A1 * | 7/2020 | Brautigam | G07C 5/0841 |
| 2020/0374498 A1 * | 11/2020 | Sodhi | H04N 9/3176 |

FOREIGN PATENT DOCUMENTS

WO  WO2017011817  *  1/2017  ............. H04N 5/77

* cited by examiner

*Primary Examiner* — Phuc N Doan
(74) *Attorney, Agent, or Firm* — Blank Rome LLP

(57) ABSTRACT

Generating a representation of a scene includes detecting an indication to capture sensor data to generate a virtual representation of a scene in a physical environment at a first time, in response to the indication obtaining first sensor data from a first capture device at the first time, obtaining second sensor data from a second capture device at the first time, and combining the first sensor data and the second sensor data to generate the virtual representation of the scene.

19 Claims, 6 Drawing Sheets

AUTOMATICALLY CAPTURING A MOMENT

BACKGROUND

This disclosure relates generally to the field of digital image capture, and more specifically to the field of capturing a moment by multiple capture devices.

Today's electronic devices provide users with many ways to capture the world around them. Often, personal electronic devices come with one or more cameras that allow users to capture innumerable photos of their loved ones and important moments. Photos or videos allow a user to revisit a special moment. However, often by the time I user opens a camera application and points a capture device at a scene, the important moment may have passed.

SUMMARY

In one embodiment, a method for capturing a moment is described. The method may include detecting an indication to capture sensor data to generate a virtual representation of a scene in a physical environment at a first time. The method also includes, in response to the indication, obtaining first sensor data from a first capture device at the first time, obtaining second sensor data from a second capture device at the first time, and combining the first sensor data and the second sensor data to generate the virtual representation of the scene.

In another embodiment, the method may be embodied in computer executable program code and stored in a non-transitory storage device. In yet another embodiment, the method may be implemented in an electronic device.

DETAILED DESCRIPTION

Figure 1:
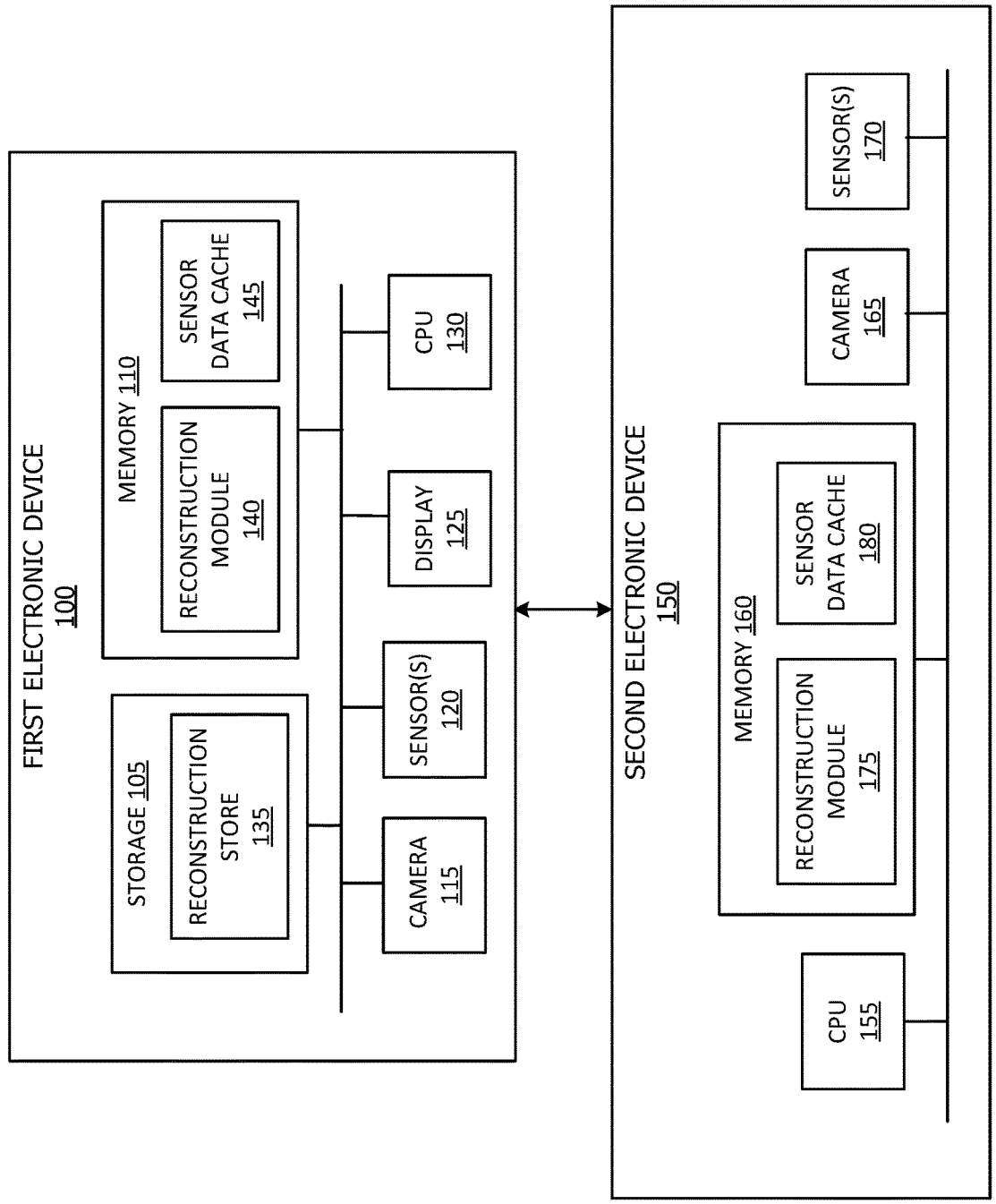
FIG. 1 shows, in block diagram form, a simplified system diagram according to one or more embodiments.

This disclosure is directed to systems, methods, and computer readable media for providing a virtual representation of a scene. In general, techniques are disclosed to provide a technique for detecting a triggering event to obtain sensor data from which the virtual representation may be recreated. The virtual representation of the scene may include at least a partial 3D representation of the scene, a 360 degree view of a scene, or the like. In response to detecting the triggering event, a system may obtain sensor data from two or more capture devices. The sensor data may be obtained from cached sensor data for each of the capture devices, and may be obtained for a particular time, or a particular time window (e.g, 5 relevant seconds, etc.).

According to one or more embodiments, the time or time window may be a predetermined amount of time before the indication is detected, a time at which the indication is detected, or a predetermined time after the indication is detected. Further, the time or time window for which the sensor data is obtained may vary dynamically, for example based on context or user input. The sensor data obtained may be used to generate the virtual representation of the scene, and the virtual representation may be store, either locally or on network storage.

According to one or more embodiments, the capture devices may be on a same device or on different devices. Further, one or more of the capture devices may be cameras. The images captured from the cameras may be used for light field reconstruction. In one or more embodiments, the light field reconstruction, or other reconstruction from sensor data, may be processed on a local device and/or on a network device, such as a server computer.

In one or more embodiments, a set of user devices may opt-in to a data capturing session such that each device continuously caches a most recent set of sensor data. Upon receiving a request from one device to reconstruct a scene, the cached sensor data for a given time or time window is obtained from the participating devices, and a central device, such as a cloud device, may generate the reconstructed scene and provide it to the requesting user. In one or more embodiments, the device may also provide the reconstructed scene to other devices, such as the other participating devices.

In one or more embodiments, the detected indication to capture sensor data for a scene may be a request from a user through user input. For example, the user may indicate the request through user input, such as by tactile input, pressing a button, voice-based input, gaze-detection based input, gesture-based input, or the like. Further, in one or more embodiments, the detected indication may be a more passive indication, such as a detection of particular biofeedback characteristics. For example, sensors on a wearable device may track a user's biofeedback characteristics and utilize biofeedback characteristics as an indication to obtain sensor data to reconstruct a scene. Examples of biofeedback which may be associated with an indication include pupil dilation, change in heart rate, change in temperature, change in movement of a user (e.g., speed, acceleration of a user or a part of the user), and the like.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed embodiments. In this context, it should be understood that references to numbered drawing elements without associated identifiers (e.g., 100) refer to all instances of the drawing element with identifiers (e.g., 100a and 100b). Further, as part of this description, some of this disclosure's drawings may be provided in the form of a flow diagram. The boxes in any particular flow diagram may be presented in a particular order. However, it should be understood that the particular flow of any flow diagram is used only to exemplify one embodiment. In other embodiments, any of the various components depicted in the flow diagram may be deleted, or the components may be performed in a different order, or even concurrently. In addition, other embodiments may include additional steps not depicted as part of the flow diagram. The language used in this disclosure has been principally selected for readability and instructional purposes, and may not have been selected to delineate or circumscribe the disclosed subject matter. Reference in this disclosure to "one embodiment" or to "an embodiment" means that a particular feature, structure, or characteristic described in connection with the embodiment is included in at least one embodiment, and multiple references to "one embodiment" or to "an embodiment" should not be understood as necessarily all referring to the same embodiment or to different embodiments.

It should be appreciated that in the development of any actual implementation (as in any development project), numerous decisions must be made to achieve the developers' specific goals (e.g., compliance with system and business-related constraints), and that these goals will vary from one implementation to another. It will also be appreciated that such development efforts might be complex and time consuming, but would nevertheless be a routine undertaking for those of ordinary skill in the art of image capture having the benefit of this disclosure.

For purposes of this disclosure, the term "camera system" refers to one or more lens assemblies along with the one or more sensor elements and other circuitry utilized to capture an image. For purposes of this disclosure, the "camera" may include more than one camera system, such as a stereo camera system, multi-camera system, or a camera system capable of sensing the depth of the captured scene.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality. A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects, A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality. An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Referring to FIG. 1, a simplified block diagram of first electronic device 100 is depicted, communicably connected to a second electronic device 150, in accordance with one or more embodiments of the disclosure. Electronic device 100 may be part of a multifunctional device, such as a mobile phone, tablet computer, personal digital assistant, portable music/video player, wearable device, base station, laptop computer, desktop computer, network device, head mounted device, or any other electronic device. In one or more embodiment, electronic device 100 and/or second electronic device 150 may have light field capture capabilities, and/or light field display capabilities. FIG. 1 shows, in block diagram form, an overall view of a system diagram capable of capturing sensor data, such as image data. First electronic device 100 may include, for example, a head mounted device which includes a camera and/or other sensors.

First electronic device 100 may be connected to the second electronic device 150 across a network, a wired connection, a Bluetooth or other short range connection, among others. Second electronic device 150 may be another multifunctional device, as described above. For purposes of the example, second wearable device 150 may include less features than the first electronic device. For example, second electronic device 150 may have less processing power than the first electronic device 100.

Electronic Device 100 may include processor, such as a central processing unit (CPU) 130. Processor 130 may be a system-on-chip such as those found in mobile devices and include one or more dedicated graphics processing units (GPUs). In one or more embodiments, the system-on-chips may be configured to perform specialized functions, such as those described below with respect to reconstructions. Further processor 130 may include multiple processors of the same or different type. Electronic Device 100 may also include a memory 110. Memory 110 may include one or more different types of memory, which may be used for performing device functions in conjunction with processor 130. For example, memory 110 may include cache, ROM, RAM, or any kind of transitory or non-transitory computer readable storage medium capable of storing computer readable code. Memory 110 may store various programming modules for execution by processor 130, including touch reconstruction 140. Further, according to one or more embodiments, memory 110 may include short term memory, such as sensor data cache 145. Memory 110 may include short term memory, such as sensor data cache 145. In one or more embodiments, the sensor data cache 145 may continuously maintain a cache of the latest sensor data from camera 115 and sensor(s) 120. As such, an ongoing predetermined amount of visual and/or other sensor data may be continuously cached until an indication is received that the currently cached data is relevant to capture a moment. When the indication is received, the currently cached data may be moved to more persistent storage, along with contextual information, such as time and location, according to one or more embodiments. The cache 145 may include, for example, a predetermined history of recent sensor data, such as the latest 5 seconds, the latest 30 seconds, or the like. Thus, in one or more embodiments, only the latest predetermined amount of sensor data may be stored in sensor data cache 145 at a given time. In one or more embodiments, the sensor data cache 145 may begin continuously storing the sensor data in response to a user request to begin caching sensor data.

Electronic device 100 may also include storage 130. Storage 130 may include one more non-transitory computer-readable storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Storage 130 may include a reconstruction store 135. According to one or more embodiments, reconstruction store may store virtual reconstructions of scenes which are generated in response to a detection of an indication to do so. The reconstruction store 135 may provide the reconstructed scenes to the user of the first electronic device 100 through a user interface, such as by display 125, or may be provided to other users or devices in a network.

First electronic device 100 may include a camera 115, along with other sensors 120. In one or more embodiments, each of the one or more camera 115 may be a traditional RGB camera, or a depth camera. Further, camera 115 may include a stereo- or other multi-camera system, a time-of-flight camera system, or the like which capture images from which depth information of a scene may be determined. In addition, according to one or more embodiments, a projection-based depth system may be included to determine depth in a scene. Sensors 120 may include any kind of sensor that captures contextual information regarding the environment or the user using the electronic device, and may include any sensors that capture sensor data that can be utilized to reconstruct a scene at a particular time (e.g., to reconstruct the scene, or to detect an event indicating the scene should be reconstructed). For example, sensors 120 may include sensors that capture information regarding the environment, such as ambient light sensors, accelerometers, LIDAR, microphones, ultrasonic sensors, temperature sensors, gyroscopes, barometric pressure sensors, and the like. Sensors 120 may additionally, or alternatively, capture information regarding the user, such as heartrate monitors, oxymetry sensors, skin conductance sensors, skin temperature sensor, user-facing cameras, and the like.

Electronic device 100 may allow a user to interact with CGR environments. There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display 125 may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

In one or more embodiments, reconstruction module 140 may detect an indication that a scene should be reconstructed. The indication may be received as a request from a user, for example through user input, such as though a keyboard, a touch screen, audio input, gesture recognition, gaze tracking input, and the like. Further, according to one or more embodiments, the indication may be detected by more passive means, such as by detecting certain biofeedback characteristics. For example, the reconstruction module may monitor certain biofeedback signals to determine whether a particular sensor data includes a predetermined signature, or satisfies a predetermined threshold. As an example, the reconstruction module 140 may monitor heart rate for a particular heart rate value, or a particular acceleration of heart rate. As another example, a front facing camera 115 may be utilized to monitor a user's eye for pupil dilation. The reconstruction module 140 may additionally scan an environment to detect multiple devices. If a predetermined threshold set of device characteristics are met, then the reconstruction module 140 may transmit a request to the devices to begin a live field video stream. According to one or more embodiments, the threshold set of device characteristics may include, for example, a minimum number of devices detected in the environment, and/or image capture characteristics for each of the devices, such as camera capabilities, memory or storage capacity, processing availability, and the like.

According to one or more embodiments, the reconstruction module 140 may reconstruct a scene at a particular time based on the indication. In order to reconstruct the scene, the reconstruction module 140 may obtain sensor data for a time associated with the request. In one or more embodiments, the reconstruction module 140 may obtain sensor data for a time at which the indication is detected. Further in one or more embodiments, the sensor data may be obtained for a time just before or just after the sensor data is detected. For example, because the indication may correspond to a user viewing a scene, the sensor data may be obtained for just before the indication to capture the scene that the user has responded to. Further, in one or more embodiments, the sensor data may be obtained for a time just after the indication is detected. For example, a user may know that an event is about to occur and may trigger the indication such that sensor data is obtained for the time just after. The difference in the time the indication is detected and the time for which the sensor data is obtained may be predetermined, or may vary dynamically, for example based on characteristics of the scene. In one or more embodiments, sensor data may be obtained for a window of time, and the scene may be reconstructed for a portion of all of the window of time. In one or more embodiments, the window of time may be a predetermined length of time (e.g., 5 seconds, 30 seconds). The scene may be regenerated for some or all of the time. That is, the reconstructed scene may be a still scene, or may be moving, such as with a video. According to one or more embodiments, the window may be obtained to include before the indication is detected, when the indication is detected, after the indication is detected, or some combination thereof. Thus, in one or more embodiments, an interface may be provided to the user such that the user can indicate what portion of the time window (or may select all of the time window) from which the scene should be reconstructed. The sensor data may be obtained from camera 155 and/or additional sensors 120 as part of first electronic device 100. Additionally, as will be described below, the reconstruction module 140 may also utilize sensor data from sensors 170 of second electronic device 150. According to one or more embodiments, the functionality of the reconstruction module may be performed within the first electronic device 100, or distributed across a network. Further, some or all functionality of the reconstruction module 140 may be performed by a specialized system-on-chip.

Second electronic device 150 may have components similar to those described above with respect to first electronic device 100. Second electronic device 150, may include, for example, a memory 160 and CPU 155. Further, second electronic device 150 may include a camera 165 and other sensors 170. In one or more embodiments, second electronic device may have less processing power, storage, and/or other resources which may limit the functionality of the second electronic device 150 for purposes of this example. Accordingly, as depicted, second electronic device 150 may not have a storage for a reconstruction store, as first electronic device 100 does. Memory 160 may include one or more different types of memory, which may be used for performing device functions in conjunction with processor 155. For example, memory 160 may include cache, ROM, RAM, or any kind of transitory or non-transitory computer readable storage medium capable of storing computer readable code. Memory 160 may store various programming modules for execution by processor 155, including touch reconstruction 175.

According to one or more embodiments, for example in the situation where second electronic device 150 has limited resources, the reconstruction module 175 may have limited capability. For example, reconstruction module 175 may simply be an interface, such as a web-based interface, which requests reconstruction of a scene at a particular time. Accordingly, a user may request a reconstructed scene, or the reconstruction module 175 may detect an indication for a reconstructed scene based on sensor data from sensors 170, and cached sensor data may be sent to another device, such as first electronic device 100, for processing (e.g., to generate the virtual reconstruction).

Although the first electronic device 100 and the second electronic device 150 are depicted as comprising the numerous components described above, in one or more embodiments, the various components may be distributed differently, or across additional devices. Particularly, in one or more embodiments, one or more of the reconstruction store 135, reconstruction module 140, and reconstruction module 175 (with respect to the distinctions described above) may be distributed differently across the first electronic device 100 and the second electronic device 150. Accordingly, although certain calls and transmissions are described herein with respect to the particular systems as depicted, in one or more embodiments, the various calls and transmissions may be made differently directed based on the differently distributed functionality. Further, additional components may be used, some combination of the functionality of any of the components may be combined.

Figure 2:
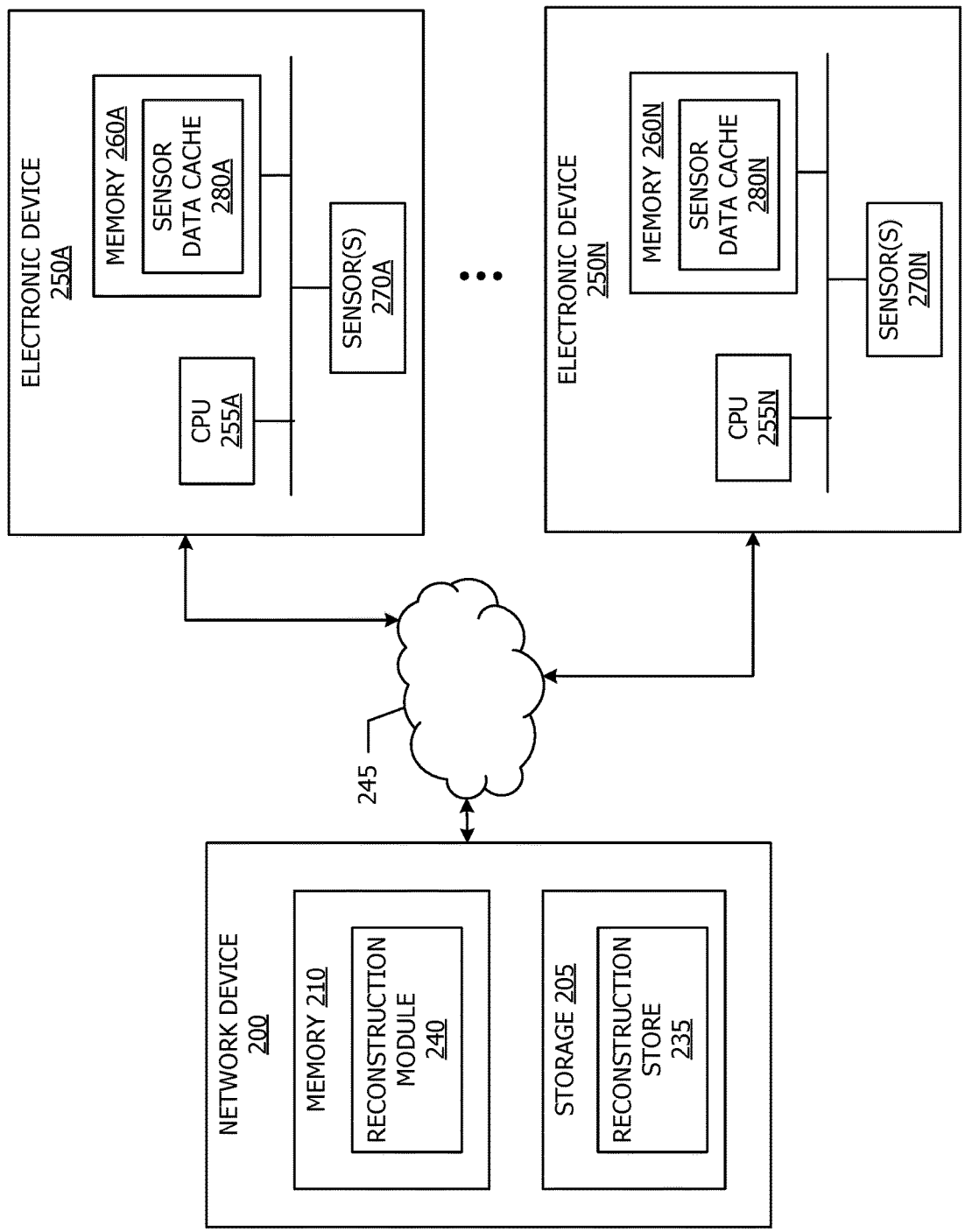
FIG. 2 shows, in block diagram form, an alternate simplified system diagram according to one or more embodiments.

FIG. 2 shows, in block diagram form, an alternate simplified system diagram according to one or more embodiments. Specifically, FIG. 2 shows a set of electronic devices 250A-250N communicably connected to each other and to a network device 200 over a network 245.

Electronic devices 250A-250N may include components and modules similar to those described above as part of first electronic device 100 and second electronic device 150, according to one or more embodiments. For purposes of this example system, each electronic device 250A-250N may include a CPU 255A-255N, and a memory 260A-260N. CPU 255A-255N may be processors which may be configured to execute instructions, such as those stored on memories 260A-260N. CPU may be any kind of hardware computer processor, such as a system-on-chip such as those found in mobile devices and include one or more dedicated graphics processing units (GPUs). Further CPU 255A-255N may include multiple processors of the same or different type. Memory 260A-260N may include one or more different types of memory, which may be used for performing device functions in conjunction with CPU 255A-255N. For example, memory 260A-260N may include cache, ROM, RAM, or any kind of transitory or non-transitory computer readable storage medium capable of storing computer readable code. Memory 260A-260N may store various programming modules for execution by CPU 255A-255N, including a touch reconstruction module (not shown).

Memory 260A-260N may include short term memory, such as sensor data cache 280A-280N. In one or more embodiments, the sensor data cache 280A-280N may continuously maintain a cache of the latest sensor data from sensor(s) 270A-270N. Sensor(s) 270A-270N may include any kind of sensor that captures contextual information regarding the environment or the user using the electronic device, and may include any sensors that capture sensor data that can be utilized to reconstruct a scene at a particular time (e.g., to reconstruct the scene, or to detect an event indicating the scene should be reconstructed). For example, sensor(s) 270A-270N may include sensors that capture information regarding the environment, such as a traditional RGB camera, or a depth camera, a stereo- or other multi-camera system, a time-of-flight camera system, or the like which capture images from which depth information of a scene may be determined. Sensor(s) 270A-270N may also include such sensors as ambient light sensors, accelerometers, LIDAR, microphones, ultrasonic sensors, temperature sensors, gyroscopes, barometric pressure sensors, and the like. Sensors 120 may additionally, or alternatively, capture information regarding the user, such as heartrate monitors, oxymetry sensors, skin conductance sensors, skin temperature sensor, user-facing cameras, and the like. The sensor data cache 280A-280N may include, for example, a predetermined history of recent sensor data, such as the latest 5 seconds, the latest 30 seconds, or the like. Thus, in one or more embodiments, only the latest predetermined amount of sensor data may be stored in sensor data cache 280A-280N at a given time. In one or more embodiments, the sensor data cache 280A-280N may begin continuously storing the sensor data in response to a user request to begin caching sensor data.

Network device 200 may be an electronic device communicably coupled to electronic devices 250A-250N. According to one or more embodiments, network device 200 may include a memory 210 and a storage 205, and may be configured to perform operations utilizing data from, and/or on behalf of the electronic devices 250A-250N. Although a single electronic device is depicted, it should be understood that the components within network device 200 may be distributed among multiple components, such as additional network devices or network storage, such as cloud storage.

Memory 210 may include cache, ROM, RAM, or any kind of transitory or non-transitory computer readable storage medium capable of storing computer readable code executable by a processor of network device 200 (not shown). Memory 210 may store various programming modules, including a reconstruction module 240. Reconstruction module may receive a request from one of electronic devices 250A-250N for a reconstruction of a scene. The request may be received via user input, or from a detected set of user characteristics, such as predetermined biofeedback values or signatures, as described above. In one or more embodiments, upon detecting the indication to reconstruct a scene, the reconstruction module 240 may obtain sensor data from electronic devices 250A-250N. In one or more embodiments, the reconstruction module 240 may obtain the sensor data from the requesting electronic device with the indication to reconstruct a scene and, thus, the reconstruction module 240 may obtain additional sensor data from the remaining electronic devices.

In one or more embodiments, the reconstruction module 240 reconstructs the scene by combining the various sensor data to create a VR environment. For example, each of electronic devices 250A-250N may provide image data of a common scene at a same time from different perspectives. Reconstruction module 240 may stitch together the image data to obtain a reconstructed light field. As another example, audio data may be captured from one or more of electronic devices 250A-250N and the audio data may be used to enhance an environment reconstructed by sensor data from other electronic devices. Reconstructing the various sensor data from multiple sources may require calibrating time and/or location of the various devices. In one or more embodiments, leveraging precise visual inertial odometry of the devices, global positioning, synchronized clock and factory calibration may be utilized. SLAM (simultaneous localization and mapping) may also be utilized for calibration. The various calibrations may enhance in the generation of a 3D light field model, and/or a 360 video for the capture of the moment. The reconstruction may be a still instant, or a video feed, such as a three dimensional video feed for the requested time. Further, according to one or more embodiments, the reconstruction could be performed offline, after an action, or live, based on device capability.

In one or more embodiments, network device 200 may include a reconstruction store 235 in storage 205. According to one or more embodiments, the requested reconstruction of the scene may be stored in reconstruction store 235. The reconstructed scene may be additionally, or alternatively, be transmitted to the requesting electronic device. Further, in one or more embodiments, the reconstruction store 235 may make available the reconstructed scene to other electronic devices, such as the electronic devices which provided sensor data utilized to reconstruct the scene.

Figure 3:
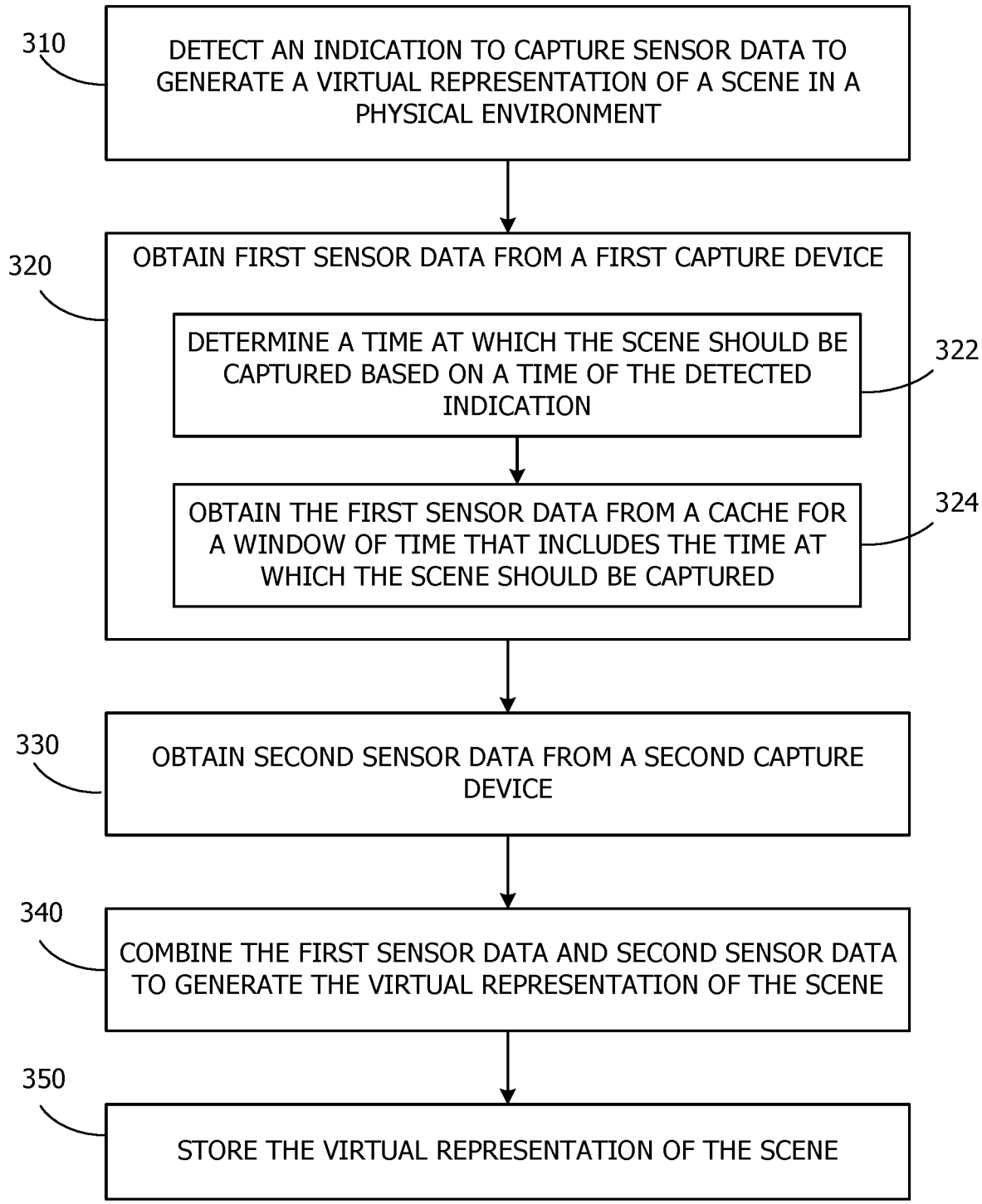
FIG. 3 shows, flow chart form, an example technique for generating a virtual representation of a scene, in accordance with one or more embodiments.

FIG. 3 shows, flow chart form, an example technique for generating a virtual representation of a scene, in accordance with one or more embodiments. For purposes of explanation, the following steps will be described in the context of FIGS. 1 and 2. However, it should be understood that the various actions may be taken by alternate components. In addition, the various actions may be performed in a different order. Further, some actions may be performed simultaneously, and some may not be required, or others may be added.

The flowchart begins at 310 where a reconstruction module on a user device (such as first electronic device 100, second electronic device 150, or any of electronic devices 250A-250N) detects an indication to capture sensor data to generate a virtual representation of a scene in a physical environment. As described above, the indication may be an active indication by the user, such as a user entering a request through a user interface or otherwise indicating to an electronic device that a scene should be captured. Alternatively, the electronic device may detect a more passive indication from a user, such as biometric feedback that indicates something has happened in the scene that is of interest to the user. As an example, an increased heartrate or a dilation of a pupil of a user may indicate that the user is experiencing something of interest.

Further, in one or more embodiments, the indication may be determined independent of user activity. For example, the indication may be detected based on something happening in the scene. As an example, if one or more electronic devices are watching a baseball game, the sensors of the devices may detect that a homerun is hit by tracking the baseball. The location of the baseball in a particular portion of the park may be an indication that the virtual representation should be generated. As another example, the reconstruction module may maintain events or other characteristics of a scene which the user may be interested, for example based on historical data regarding reconstructed scenes and machine learning.

The flowchart continues at 320, where the reconstruction module obtains first sensor data from a first capture device. In one or more embodiments, the first capture device may be a sensor, such as a camera, on a local device. At 322, the reconstruction module may determine a time at which the scene should be captured based on a time of the detected indication. As described above, the time at which the scene should be captured may be at the time at which the indication is detected, or may be a time before or after the indication is detected. Moreover, the time at which the scene should be captured may include a time window. At 324, the reconstruction module obtains the first sensor data from a cache for a window of time that includes the time at which the scene should be captured. The sensor data may be obtained from one or more sensors of the first device, such as a camera, depth sensor, microphone, and the like as described above.

At 330, the reconstruction module obtains second sensor data from a second capture device. In one or more embodiments, the second capture device may be a sensor, such as a camera, on a local device or on a remote device. Similar to that described above with respect to 320, the reconstruction module may determine a time at which the scene should be captured based on a time of the detected indication. As described above, the time at which the scene should be captured may be at the time at which the indication is detected, or may be a time before or after the indication is detected. Moreover, the time at which the scene should be captured may include a time window. Further, the reconstruction module obtains the first sensor data from a cache for a window of time that includes the time at which the scene should be captured. The sensor data may be obtained from one or more sensors of the first device, such as a camera, depth sensor, microphone, and the like as described above. According to one or more embodiments, the first and/or the second devices may anonymize the sensor data prior to transmitting the sensor data to a network device for reconstruction. Further, the first and/or the second devices may perform some preprocessing, such as data compression prior to transmitting the sensor data to a network device for reconstruction.

The flowchart continues at 340, and the reconstruction module combines the first sensor data and the second sensor data to generate the virtual representation of the scene. The reconstruction module may stitch together the image data to obtain a reconstructed light field. As another example, audio data may be captured from one or more of electronic devices and the audio data may be used to enhance an environment reconstructed by sensor data from other electronic devices. The reconstruction may be a still instant, or a video feed, such as a three dimensional video feed for the requested time. In one or more embodiments, the virtual representation may be a 360 degree view of an event.

The flowchart concludes at 350, where the reconstruction module stores the virtual representation of the scene. In one or more embodiments, the virtual representation of the scene may be stored locally, or maybe stored remotely, such as on a server or cloud storage. Further, the virtual representation may be made available to other devices. As an example, a copy of, or a link to, the virtual representation may be shared with other electronic devices, such as electronic device associated with sensors from which data was obtained for the reconstruction. Further, the virtual representation may be made available to other devices associated with users whose devices provided the sensor data at 320 or 330. For example, if a user's tablet computer provided image data at 330, the virtual representation may be made available to other devices associated with that user, such as the user's mobile phone.

In one or more embodiments, the various functionality described above may be distributed differently in a system. For example, a local device may detect the indication at 310, and perhaps obtain its own sensor data at 320, while another network device may be tasked with obtaining sensor data from other devices at 330 and combining the sensor data at 340. As such, additional calls between devices may be made in order to transfer data and instructions to complete the described functionality. Further, although the flowchart only discusses a first and second capture many different sensors and/or types of sensors from multiple devices may be utilized to obtain sensor data.

Figure 4:
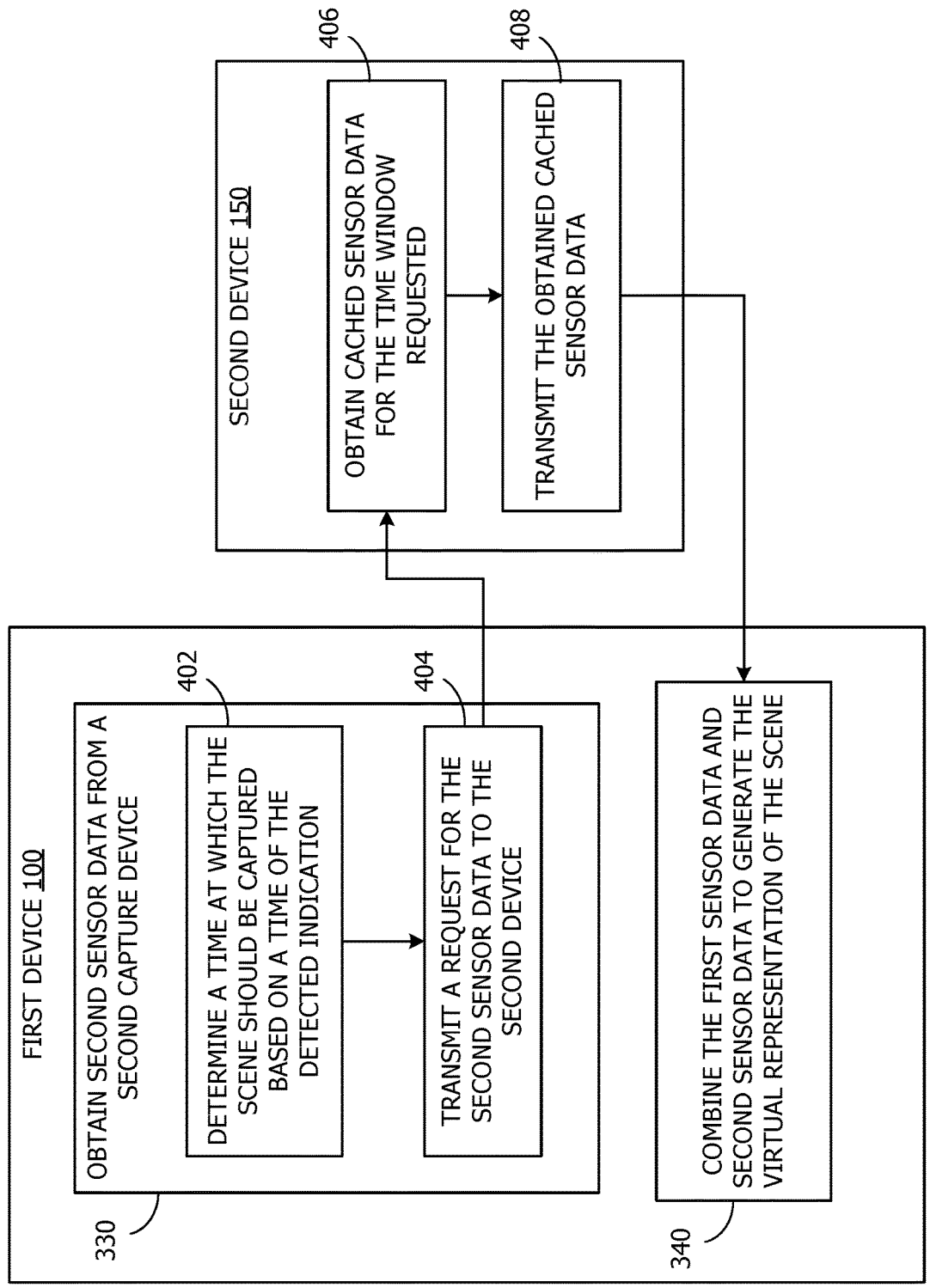
FIG. 4 shows, in flow chart form, an example technique for obtaining sensor data from multiple devices, according to one or more embodiments.

FIG. 4 shows, in flow chart form, an example technique for obtaining sensor data from multiple devices, according to one or more embodiments. Specifically, FIG. 4 shows a variation of FIG. 3 in which the first electronic device 100 requests the second sensor data from the second electronic device 150. Accordingly, FIG. 4 includes 330 and 340 of FIG. 3 which will not be explained in detail, as they have been described above.

In one or more embodiments, the first device 100 may obtain send sensor data from a second capture device, which may be part of second electronic device 150 for purposes of this flowchart. The flowchart includes, at 402, the first device 100 determines a time at which the scene should be captured based on a time of the detected indication. According to one or more embodiments, the time at which the scene should be captured may be at the time at which the indication is detected, or may be a time before or after the indication is detected. Moreover, the time at which the scene should be captured may include a time window. Then, at 404, the first device 100 transmits a request for the second sensor data to the second device 150. In one or more embodiments, the request may indicate one or more sensors or type of sensors from which sensor data should be obtained on the second device 150. Further, the request may include a timestamp at which the indication was detected, and/or may indicate a time or time window for which the sensor data should be obtained.

The flowchart continues at 406, and the second device 150 obtains cached sensor data for the requested time. In one or more embodiments, the second electronic device 150 may be configured to maintain a cache of most recent sensor data in a cache in local memory. Thus, the sensor data may be obtained from the cache for a particular time or window of time for which sensor data remains in the cache at the time the request is processed by second electronic device 150. At 408, the second device 150 transmits the obtain cached sensor data to the first device 100. The flowchart concludes at 340 where the first electronic device 100 combines the first sensor data, for example, from first electronic device 100 or another device, and the second sensor data from second electronic device 150 to generate the virtual representation of the scene.

Figure 5:
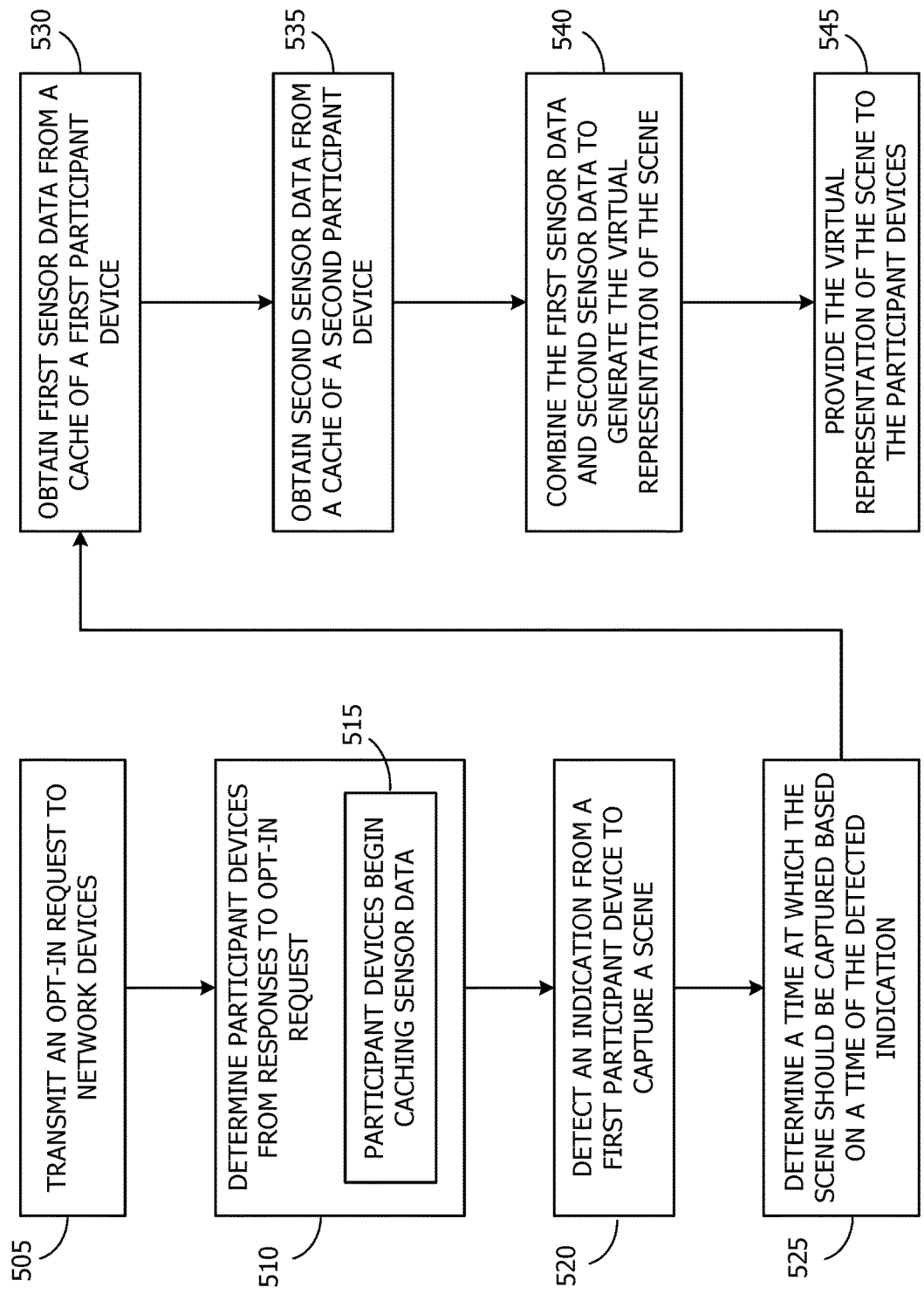
FIG. 5 shows, in flow chart form, an example technique for providing virtual representations of scenes to multiple electronic devices, according to one or more embodiments.

FIG. 5 shows, in flow chart form, an example technique for providing virtual representations of scenes to multiple electronic devices, according to one or more embodiments. Specifically, FIG. 5 depicts a flowchart of an example embodiment in which sensor data may be crowdsourced by multiple devices capturing sensor data related to a common scene or environment.

The flowchart begins at 505 where the reconstruction module transmits an opt-in request to network devices. In one or more embodiments, a network device may detect other devices in an environment which may be capturing sensor data in the environment. For example, the additional devices in the environment may be discoverable over a network. The opt-in request may indicate that the requesting device may wish to access cached sensor data of the additional devices. In addition, in one or more embodiments, the opt-in request may also indicate that the device receiving the opt-in request, a user account receiving the opt-in request, may have access to at least some of the cached sensor data from other participant devices, and/or may additionally request reconstructed scenes from the group sensor data. In one or more embodiments, some of the network devices may be associated with a common user account and, thus, one opt-in request may be transmitted to the user account, and may determine whether the sensor data may be obtained from the commonly-assigned devices based on the response to the opt-in request from the user account.

The flowchart continues at 510 where the reconstruction module determines participant devices from responses to the opt-in request. The participant devices may be devices which have affirmatively responded to the opt-in message, or which are associated with user accounts from which an affirmative response to the opt-in request is received. At 515, the participant devices begin caching sensor data. As described above, the sensor data may be cached for a predetermined amount of time (e.g., 5 seconds, 30 seconds, 1 minute). In one or more embodiments, the amount of sensor data cached may vary by participant device, or data type. For example, audio data may be cached for longer than image data because audio data requires less memory to store.

As another example, a smart watch may cache sensor data for less time than a tablet device because the smart watch is likely to have less memory.

The flowchart continues at 520, where the reconstruction module detects an indication from a first participant device to capture a scene. As described above, the indication may be an active indication by the user, such as a user entering a request through a user interface or otherwise indicating to an electronic device that a scene should be captured. Alternatively, the electronic device may detect a more passive indication from a user, such as biometric feedback that indicates something has happened in the scene that is of interest to the user. Further, in one or more embodiments, the indication may be determined independent of user activity.

At 525, the reconstruction module determines a time at which the scene should be captured based on a time of the detected indication. As described above, the time at which the scene should be captured may be at the time at which the indication is detected, or may be a time before or after the indication is detected. Moreover, the time at which the scene should be captured may include a time window.

The flowchart continues at 530 and the reconstruction module obtains first sensor data from a first cache of a first participant device. In one or more embodiments, the first participant device may be the local device, or may be an additional participant device. At 535, the reconstruction module obtains second sensor data from a second cache of a second participant device. The sensor data obtained from the first and second devices may be any type of sensor data which is available for the specified time and/or time window.

The flowchart continues at 540 where the reconstruction module combines the first sensor data and the second sensor data to generate the virtual representation of the scene. The reconstruction module may stitch together the image data to obtain a reconstructed light field. As another example, audio data may be captured from one or more of electronic devices and the audio data may be used to enhance an environment reconstructed by sensor data from other electronic devices. The reconstruction may be a still instant, or a video feed, such as a three dimensional video feed or a reconstructed light field for the requested time or time window.

The flowchart concludes at 545, where the reconstruction module provides the virtual representation of the scene. In one or more embodiments, the virtual representation of the scene may be stored locally, or maybe stored remotely, such as on a server or cloud storage. The virtual representation may be made available to other devices. As an example, a copy of, or a link to, the virtual representation may be shared with other electronic devices, such as electronic device associated with sensors from which data was obtained for the reconstruction. Further, the virtual representation may be made available to other devices associated with users whose devices provided the sensor data. For example, if a user's tablet computer provided image data, the virtual representation may be made available to other devices associated with that user, such as the user's mobile phone.

Figure 6:
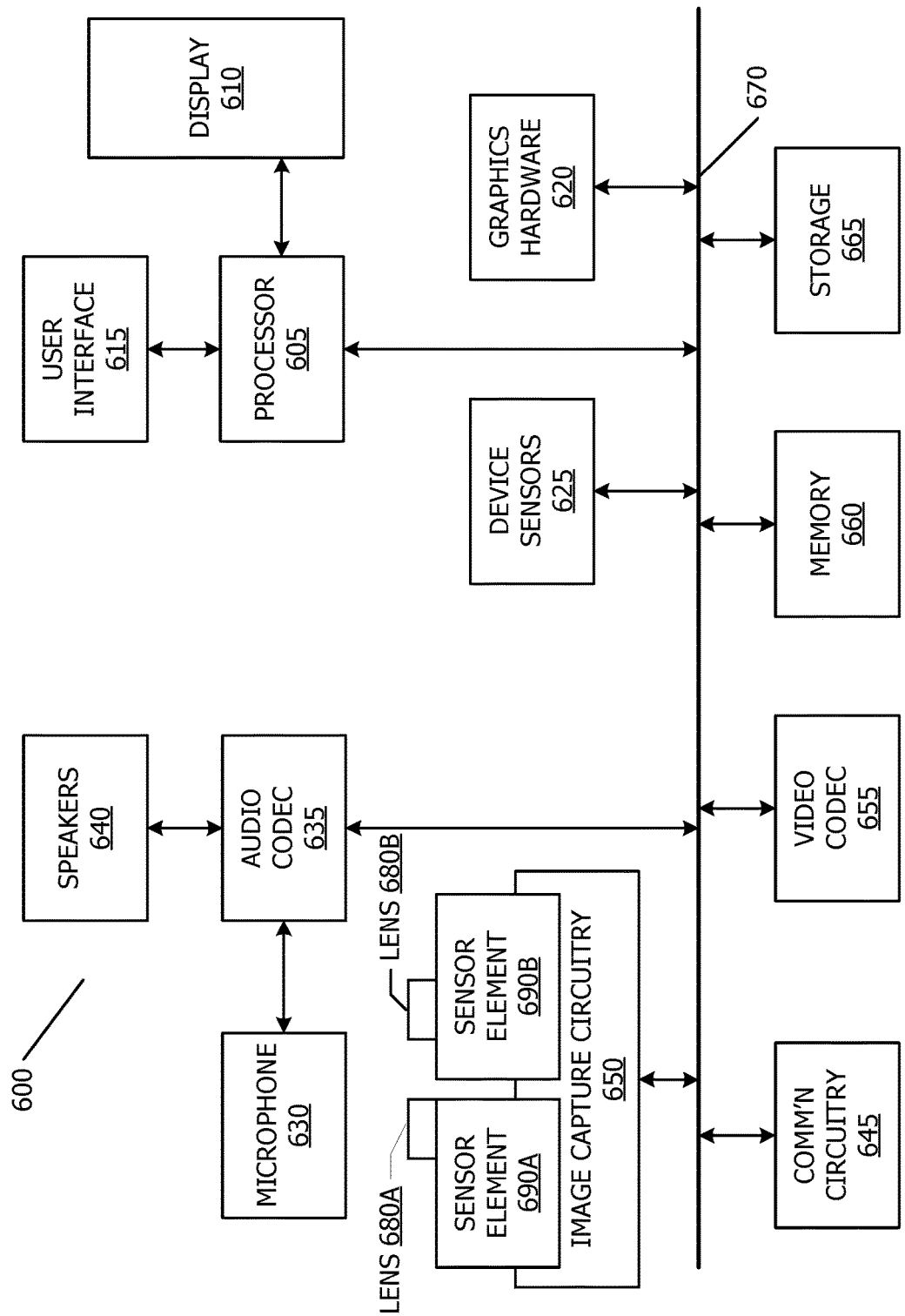
FIG. 6 shows, in block diagram form, a simplified multifunctional device according to one or more embodiments.

Referring now to FIG. 6, a simplified functional block diagram of illustrative multifunction electronic device 600 is shown according to one embodiment. Each of electronic devices may be a multifunctional electronic device, or may have some or all of the described components of a multifunctional electronic device described herein. Multifunction electronic device 600 may include processor 605, display 610, user interface 615, graphics hardware 620, device sensors 625 (e.g., proximity sensor/ambient light sensor, accelerometer and/or gyroscope), microphone 630, audio codec(s) 635, speaker(s) 640, communications circuitry 645, digital image capture circuitry 650 (e.g., including camera system) video codec(s) 655 (e.g., in support of digital image capture unit), memory 660, storage device 665, and communications bus 670. Multifunction electronic device 600 may be, for example, a digital camera or a personal electronic device such as a personal digital assistant (PDA), personal music player, mobile telephone, or a tablet computer.

Processor 605 may execute instructions necessary to carry out or control the operation of many functions performed by device 600 (e.g., such as the generation and/or processing of images as disclosed herein). Processor 605 may, for instance, drive display 610 and receive user input from user interface 615. User interface 615 may allow a user to interact with device 600. For example, user interface 615 can take a variety of forms, such as a button, keypad, dial, a click wheel, keyboard, display screen and/or a touch screen. Processor 605 may also, for example, be a system-on-chip such as those found in mobile devices and include a dedicated graphics processing unit (GPU). Processor 605 may be based on reduced instruction-set computer (RISC) or complex instruction-set computer (CISC) architectures or any other suitable architecture and may include one or more processing cores. Graphics hardware 620 may be special purpose computational hardware for processing graphics and/or assisting processor 605 to process graphics information. In one embodiment, graphics hardware 620 may include a programmable GPU.

Image capture circuitry 650 may include two (or more) lens assemblies 680A and 680B, where each lens assembly may have a separate focal length. For example, lens assembly 680A may have a short focal length relative to the focal length of lens assembly 680B. Each lens assembly may have a separate associated sensor element 690. Alternatively, two or more lens assemblies may share a common sensor element. Image capture circuitry 650 may capture still and/or video images. Output from image capture circuitry 650 may be processed, at least in part, by video codec(s) 655 and/or processor 605 and/or graphics hardware 620, and/or a dedicated image processing unit or pipeline incorporated within circuitry 665. Images so captured may be stored in memory 660 and/or storage 665.

Sensor and camera circuitry 650 may capture still and video images that may be processed in accordance with this disclosure, at least in part, by video codec(s) 655 and/or processor 605 and/or graphics hardware 620, and/or a dedicated image processing unit incorporated within circuitry 650. Images so captured may be stored in memory 660 and/or storage 665. Memory 660 may include one or more different types of media used by processor 605 and graphics hardware 620 to perform device functions. For example, memory 660 may include memory cache, read-only memory (ROM), and/or random access memory (RAM). Storage 665 may store media (e.g., audio, image and video files), computer program instructions or software, preference information, device profile information, and any other suitable data. Storage 665 may include one more non-transitory computer-readable storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 660 and storage 665 may be used to tangibly retain computer program instructions or code organized into one or more modules and written in any desired computer programming language. When executed by, for example, processor 605 such computer program code may implement one or more of the methods described herein.

According to one or more embodiments, camera-based transparent display may have numerous uses. For example, the techniques described above may be used for image stabilization. That is, a warping function utilized to warp the image may also be utilized to stabilize an image. In another embodiment, the camera-based transparent display may be used for machine learning. For example, a camera may capture images of a scene and classify the scene, and/or objects within the scene. In one or more embodiments, by tracking an object at which a user's eye is gazing, objects may be identified which should be classified.

In one or more embodiments, the camera-based transparent display may be used for presenting virtual information on the display, for example for augmented reality purposes. As an example, digital information associated with a particular location may be displayed in a more accurate location as perceived from a particular viewpoint through the display. As an example, an image of the scene may be enhanced by additional text or image data at a particular point within the scene in the warped image. In one or more embodiment, the digital information may be associated with a particular object in the scene. When the object falls within the warped image (or, when the object is visible in the display), then the digital information associated with the object may be displayed along with the object in the warped image. In one or embodiment, as the warped image changes, whether a change in the scene occurs, or a change in the warping occurs due to a change in location of the viewpoint or the device relative to the scene, the digital information may also change.

As described above, one aspect of the present technology is the gathering and use of data available from various sources to generate a virtual representation of a scene. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to generate a virtual representation of a scene. Accordingly, use of such personal information data enables users to interact with a reconstructed scene. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

The scope of the disclosed subject matter should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A non-transitory computer readable medium comprising computer readable code executable by one or more embodiments to:
    detect, based on user input into a user interface at a local device, an indication to light field data to generate a virtual representation of a scene in a physical environment,
    in response to the indication:
        determine a first time for the virtual representation in accordance with the user input,
        obtain, at the local device, first light field data for the scene from at least a first capture device at the first time;
        detect, by the local device, one or more remote devices;
        retrieve cached second light field data for the scene from at least a second capture device of the one or more remote devices, wherein the second light field data corresponds to data captured at the first time; and
        obtain a reconstructed light field of the scene by stitching together the first light field data and the second light field data; and
        combine the reconstructed light field and non-image sensor data, to obtain a 3D representation of the scene combined with the non-image sensor data.

2. The non-transitory computer readable medium of claim 1, wherein the first capture device is part of a first system and wherein the second capture device is part of a second system.

3. The non-transitory computer readable medium of claim 2, wherein the computer readable code to obtain second sensor data from the second capture device comprises computer readable code to:
    obtain, in response to the indication, a timestamp for the first time, and
    transmit a request for the second sensor data to the second device with the timestamp.

4. The non-transitory computer readable medium of claim 3, wherein the second light field data is obtained from a cache memory of the second device.

5. The non-transitory computer readable medium of claim 1, wherein the first capture device is a local capture device, and wherein the first light field data is obtained from a local cache.

6. The non-transitory computer readable medium of claim 5, wherein the local cache is configured to keep a most recent predetermined set of sensor data for the first capture device.

7. The non-transitory computer readable medium of claim 1,
    wherein the computer readable code to obtain the first light field data from a first capture device at the first time comprise computer code to obtain a first set of sensor data captured during a first time window, and
    wherein the computer readable code to obtain the second light field data from the second capture device at the first time comprise computer readable code to obtain a second set of sensor data captured during the first time window,
    wherein the first time window comprises the first time.

8. The non-transitory computer readable medium of claim 1, wherein the first capture device and the second capture device are comprised in a wearable device.

9. The non-transitory computer readable medium of claim 8, wherein the request is automatically generated based on a detected biofeedback signal.

10. The non-transitory computer readable medium of claim 1, wherein the request is automatically generated based on a detected event in a scene.

11. The non-transitory computer readable medium of claim 1, wherein the first time is determined to be prior to a time at which the indication is detected.

12. The non-transitory computer readable medium of claim 1,
    wherein the first capture device comprises a first camera,
    wherein the second capture device comprises a second camera,
    and wherein the virtual representation of the scene comprises a three dimensional view of a scene.

13. The non-transitory computer readable medium of claim 12, wherein the virtual representation of the scene comprises a 360 degree view of the scene.

14. A system for generating a representation of a scene, comprising:
    one or more processors; and
    a computer readable medium coupled to the one or more processors and comprising computer readable code to:
        detect, based on user input into a user interface at a local device, an indication to light field data to generate a virtual representation of a scene in a physical environment,
        in response to the indication:
            determine a first time for the virtual representation in accordance with the user input,
            obtain, at the local device, first light field data for the scene from at least a first capture device at the first time;
            detect, by the local device, one or more remote devices;
            retrieve cached second light field data for the scene from at least a second capture device of the one or more remote devices, wherein the second light field data corresponds to data captured at the first time; and obtain a reconstructed light field of the scene by stitching together the first light field data and the second light field data; and combine the reconstructed light field and non-image sensor data, to obtain a 3D representation of the scene combined with the non-image sensor data.

15. The system of claim 14, wherein the first capture device is part of a first system and wherein the second capture device is part of a second system.

16. The system of claim 15, wherein the computer readable code to obtain second sensor data from the second capture device comprises computer readable code to:

obtain, in response to the indication, a timestamp for the first time, and transmit a request for the second sensor data to the second device with the timestamp.

17. The system of claim 16, wherein the second light field data is obtained from a cache memory of the second device.

18. The system of claim 14, wherein the first capture device is a local capture device, and wherein the first light field data is obtained from a local cache.

19. A method for generating a representation of a scene, comprising:

detecting, based on user input into a user interface at a local device, an indication to light field data to generate a virtual representation of a scene in a physical environment, in response to the indication:

determining a first time for the virtual representation in accordance with the user input, obtaining, at the local device, first light field data for the scene from at least a first capture device at the first time;

detecting, by the local device, one or more remote devices;

retrieving cached second light field data for the scene from at least a second capture device of the one or more remote devices, wherein the second light field data corresponds to data captured at the first time; and obtaining a reconstructed light field of the scene by stitching together the first light field data and the second light field data; and combining the reconstructed light field and non-image sensor data, to obtain a 3D representation of the scene combined with the non-image sensor data.

* * * * *